United States Patent [19]

Tückmantel

[11] Patent Number: 4,784,411

[45] Date of Patent: Nov. 15, 1988

[54] SEAL ASSEMBLY, ESPECIALLY FOR A FLANGE SEAL

[75] Inventor: Hans-Joachim Tückmantel, M lheim a.d. Ruhr-Heissen, Fed. Rep. of Germany

[73] Assignee: H.K.O. Handelsgesellschaft mbH, Oberhausen, Fed. Rep. of Germany

[21] Appl. No.: 72,448

[22] Filed: Jul. 13, 1987

[30] Foreign Application Priority Data

Jul. 11, 1986 [DE] Fed. Rep. of Germany ....... 3623310

[51] Int. Cl.$^4$ ............................................. F16L 17/06
[52] U.S. Cl. .................................... 285/363; 285/328; 285/910
[58] Field of Search ............... 285/363, 910, 364, 365, 285/366, 367, 368, 917, 328; 277/235 R

[56] References Cited

U.S. PATENT DOCUMENTS

| | | | |
|---|---|---|---|
| 830,392 | 9/1906 | Wiedeman | 285/363 X |
| 2,513,178 | 6/1950 | Jackson | 285/363 |
| 3,937,478 | 2/1976 | Mancebo | 285/363 X |
| 4,155,561 | 5/1979 | Rudy et al. | 285/368 X |
| 4,690,438 | 9/1987 | Kanczarek | 285/363 |

Primary Examiner—Dave W. Arola
Attorney, Agent, or Firm—Herbert Dubno

[57] ABSTRACT

The joint packing, especially for sealing two abutting flanges or surfaces, comprises a sealing ring core composed of a slightly deformable metal and opposing plastic deformable soft sealing seats. The sealing ring core has chamber-defining formations on its upper side and lower side outer edge (and inside edge) running circumferentially between which the soft sealing layers are pressed when the sealing forces are applied thereto. The chamber-defining formations have a bulged rounded cross section. The surfaces between the chamber-defining formations on the outside edge and the inside edge are smooth and arched.

6 Claims, 3 Drawing Sheets

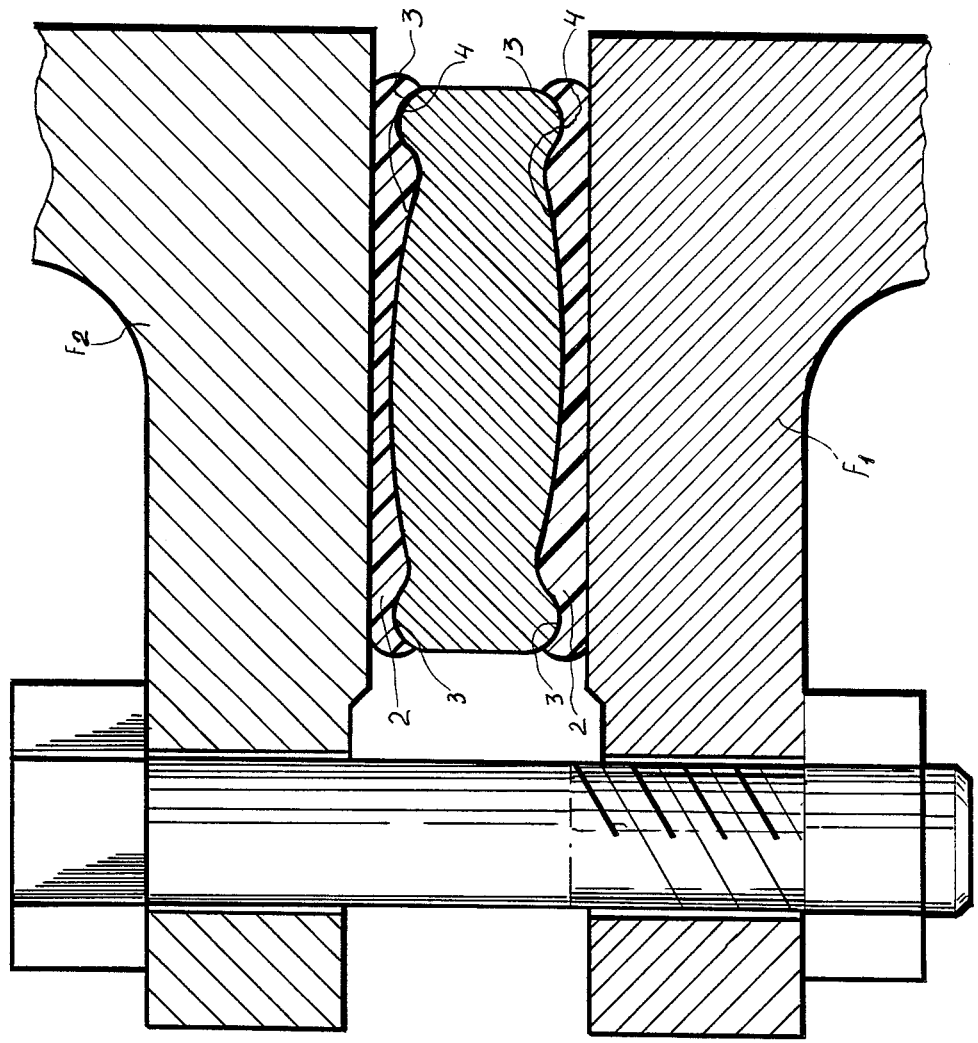

SEAL ASSEMBLY, ESPECIALLY FOR A FLANGE SEAL

FIELD OF THE INVENTION

My present invention relates to a seal assembly and, more particularly, to a gasket assembly forming a seal between two interconnected flanges, e.g. pipe flanges.

BACKGROUND OF THE INVENTION

A seal assembly can comprise a core ring composed of low deformability metal flanged by plastically deformable and hence relatively soft sealing layers, e.g. which are composed of graphite or lead.

The sealing ring core has annular formations defining a chamber on the upper side outside edge and also on the lower side outside edge running circumferentially and the soft sealing seats are pressed into the chambers by the protruding members or formations. It is understood that the material of the soft sealing seats should be so selected and dimensioned that the chamber enclosing or sealing protruding members does not come into contact with the flange surfaces during application of the sealing force.

In the known seal assembly described in German patent No. 27 56 351 the chamber-enclosing and sealing protruding members have a wedge-like sharp-crest cross section in which the teeth formed by the formations press into the soft sealing seats when the sealing force is applied.

This has proved satisfactory when the associated flange surfaces are sufficiently smooth, and, when observed microscopically, are sufficiently serration-free or groove-free and have no damage.

When, however, the flange surfaces have serrations or grooves because of imprecise or erroneous manufacture the chamber-defining formations can come into contact with the flange surfaces which can cause damage which impairs the operation or function.

In the known seal assembly the surfaces between the chamber-defining formations are saw-like in cross section running circumferentially and can form a comb seal. This seal does not function effectively when the flange surfaces are not smooth.

To make the comblike shape, moreover, an expensive machining of a blank from which the sealing is manufactured, is required.

OBJECTS OF THE INVENTION

It is an object of my invention to provide an improved seal assembly, especially for sealing a joint between two interconnected flanges which will overcome the drawbacks mentioned previously.

It is also an object of my invention to provide an improved seal assembly whose function or operation remains reliable even for flange surfaces with considerable serrations and grooves resulting from erroneous or inexact manufacture or from damage.

It is another object of my invention to provide an improved seal assembly which has a sealing which is simply and economically manufactured, but nevertheless functions reliably even when the flange surfaces have serrations or grooves.

SUMMARY OF THE INVENTION

These objects and others which will become more readily apparent hereinafter are attained in accordance with my invention in a seal assembly comprising a sealing ring core composed of a slightly deformable metal and opposing plastically deformable soft sealing layers in which the sealing at least has chamber-defining formations on the upper side outside edge and also on the lower side outside edge running circumferentially, the soft sealing layers being pressable between said chamber-defining formations. The layers are rings which flank the core ring.

According to my invention each chamber enclosing or sealing protruding member has a bulged rounded cross section and the surfaces between the chamber enclosing or sealing protruding members are smooth and arched.

According to a feature of my invention the cross section of a chamber-defining formation directed toward the soft sealing layer has a radius of curvature r which is approximately equivalent to the thickness d of the chamber-defining formation. Thus there can be four chamber-defining formations according to my invention: one on the upper side of the outside edge of the sealing ring core, one on the lower side of the outer edge, one on the upper side of the inside edge of the sealing ring core and finally one on the lower side of the inside edge of the sealing ring core.

In the sealing ring core device according to my invention the surfaces between the chamber-defining formations on the inside and outside edges of the sealing ring core can have a variety of forms.

One advantageous embodiment of my invention has a high reliability of operation because very definite pressure conditions occur in the seal assembly when the pressing force is applied. This embodiment is characterized by the surfaces between the chamber-defining formations being ring surfaces convex toward the soft sealing ring core layers.

According to the soft material which is selected for the soft sealing ring core layers the surfaces between the chamber-defining formations in another embodiment of my invention can be constructed as ring surfaces concave to the soft sealing ring core layers.

To attain certain conditions the surfaces between the chamber-defining formations connect to them by portions of the surfaces which have a radius of curvature which corresponds approximately to the thickness of the chamber-defining formations.

In the sealing ring core device according to my invention, because of the described form of the chamber-defining formations, contact between the chamber-defining formations and the associated flange surfaces damaging to their function can no longer occur.

That is also the case even when the flange surfaces are manufactured very inexactly or with irregularities and discontinuities.

Since well-defined conditions are attained the seal assembly according to my invention functions when the surfaces between the chamber-defining formations are no longer comblike in the way described but instead are concave or convex and smooth.

This allows a simple manufacture. For example the shape of the sealing ring core can be made by rolling the corresponding unfinished workpiece which has a rectangular cross section. A material removal machining step is no longer required.

The unfinished workpiece can also be a linear bar which is subsequently bent to form a ring. The sealing ring core can also be made from several segments.

BRIEF DESCRIPTION OF THE DRAWING

The above and other objects, features and advantages of my invention will become more readily apparent from the following description, reference being made to the accompanying highly diagrammatic drawing in which:

FIG. 2 is a cross sectional view of the seal assembly of FIG. 1 after application of a sealing ring core force;

SPECIFIC DESCRIPTION

Figure 4:
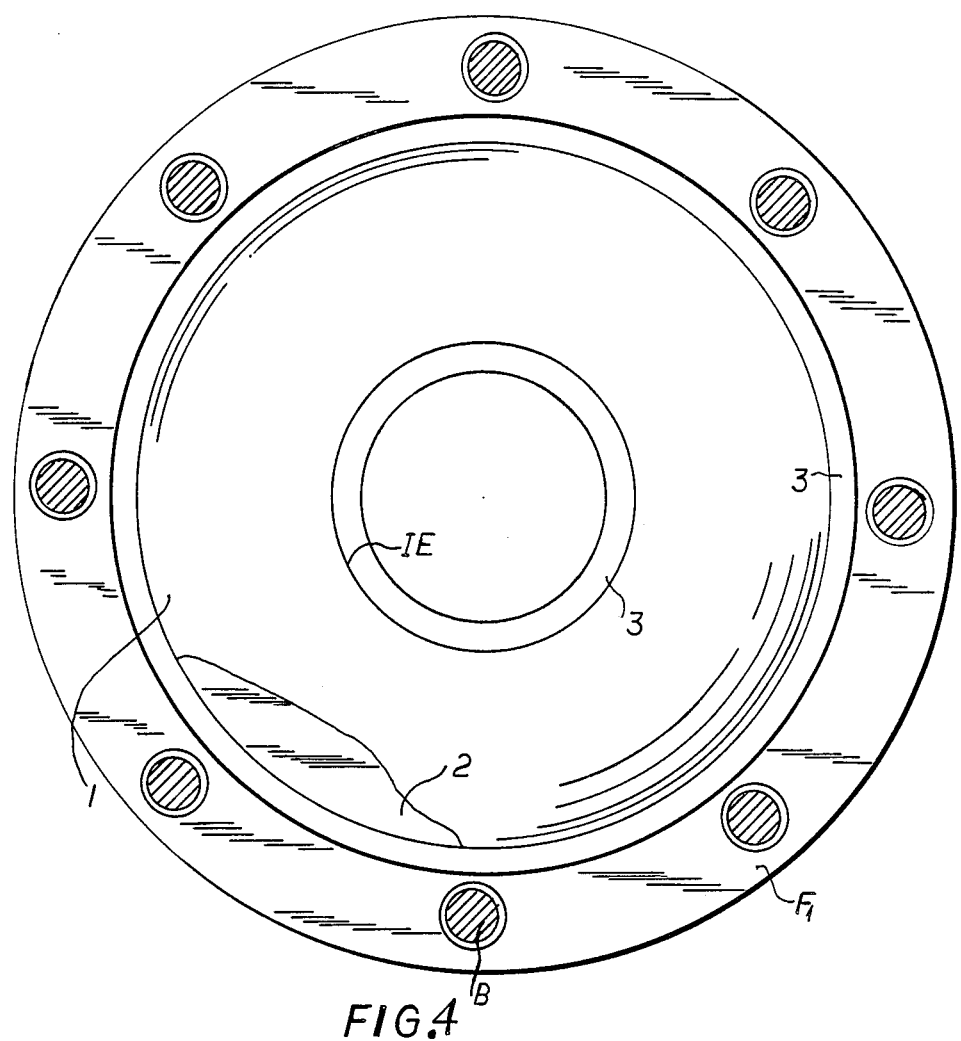
FIG. 4 is a cross sectional view taken generally along the section line IV—IV in FIG. 3.

The seal assembly shown in the drawing is designed for a sealing ring core with two interconnected flanges F1, F2 or other surfaces which can be drawn together by bolts B (FIG. 4). Its basic structure includes a sealing ring core 1 which comprises a slightly deformable or relatively nondeformable metal, e.g. steel, and two opposing plastically deformable soft sealing ring core layers 2 which can be composed of graphite, lead, plastic or the like.

The sealing ring core 1 has four chamber-defining formations 3 in this embodiment. They run circumferentially at the upper side and the lower side of the outside edge OE of the sealing ring core 1 and also at the upper side and the lower side of the inside edge IE of the sealing ring core 1. From FIGS. 1 and 2 it can be seen that the soft sealing ring core layers 2 on opposite sides of the sealing ring core 1 are pressable against the chamber-defining formations 3 when the sealing ring core force is applied.

The chamber-defining formations 3 have a bulgelike rounded cross section. The surfaces 4 between the chamber-defining formations 3 on the outside edge OE and the inside edge IE are smooth and arched. The chamber-defining formations 3 can be seen to be forced into the soft sealing ring core layers 2 and to have a radius of curvature r which corresponds approximately to the thickness d of the chamber-defining formations 3.

Figure 1:
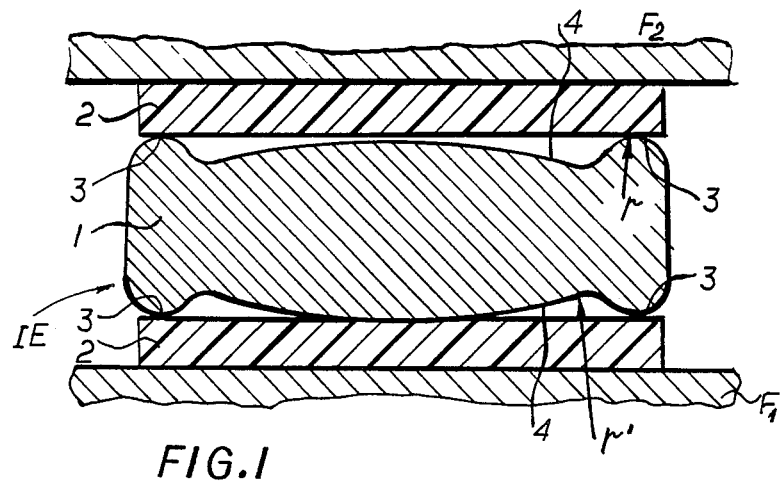
FIG. 1 is a cross sectional view through a seal assembly according to my invention between the flanges or other surfaces to be joined before application of a sealing ring core force.
Figure 3:
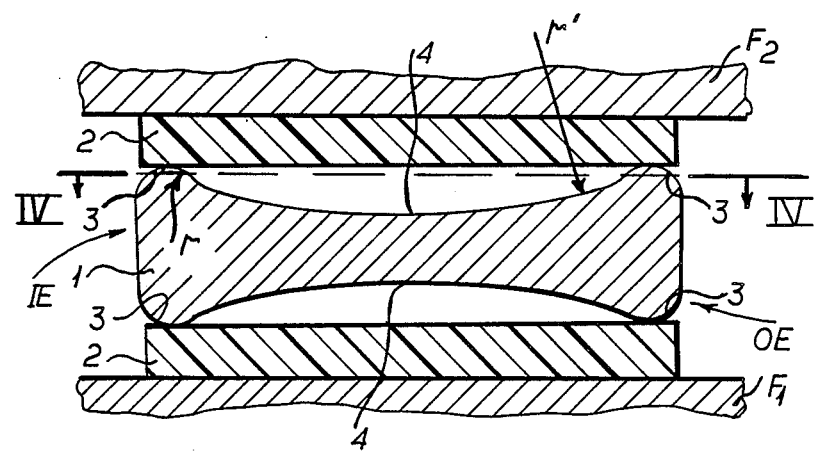
FIG. 3 is a cross sectional view through another embodiment of a seal assembly according to my invention.

In the embodiment according to FIGS. 1 and 2, the surfaces 4 between the chamber-defining formations 3 are constructed as ring surfaces convex toward the soft sealing ring core layers 2. In the embodiment according to FIG. 3 in contrast the above named surfaces 4 are concave ring surfaces. In both cases the surfaces 4 are connected to the chamber-defining formations 3 by portions of themselves or the surfaces 4 having a radius of curvature r' which corresponds approximately to the thickness d of chamber-defining formations 3.

I claim:

1. A seal assembly comprising a sealing ring core in the form of a ring with an outer and an inner circumference, composed of a slightly deformable metal, and plastically deformable soft annular sealing ring core layers flanking said sealing ring core, said sealing ring core having at least one chamber-defining formation on an upper side of an edge thereof, said edge being near said outer circumference and on a lower side of said edge thereof running circumferentially, said soft sealing ring core layers being depressable by said chamber-defining formations on application against said layers of a compressing means to force together said sealing ring core and layers, the improvement wherein each of said chamber defining formations has a bulged rounded cross section and surfaces between said chamber-defining formations on said upper and lower sides of said core ring are smooth and arched.

2. The seal assembly defined in claim 1 wherein the cross section of said chamber-defining formations directed toward said soft sealing ring core layers has a radius of curvature which is approximately equivalent to a thickness of said chamber-defining formation.

3. The seal assembly defined in claim 1 wherein said surfaces between said chamber-defining formations are ring surfaces convex to said soft sealing ring core layers.

4. The seal assembly defined in claim 1 wherein said surfaces between said chamber-defining formations are ring surfaces concave to said soft sealing ring core layers.

5. The seal assembly defined in claim 4 wherein said surfaces between said chamber-defining formations are connected to said chamber-defining formations by portions of said surfaces having a radius of curvature which approximately corresponds to the thickness of said chamber-defining formations.

6. The seal assembly defined in claim 1 wherein said compressing means comprises a pair of flanges respectively bearing on said layers and bolts drawing said flanges together to generate a sealing ring core force.

* * * * *